(12) United States Patent
Barnes-Leon et al.

(10) Patent No.: US 7,287,041 B2
(45) Date of Patent: Oct. 23, 2007

(54) DATA MODELING USING CUSTOM DATA TYPES

(75) Inventors: Maria Theresa Barnes-Leon, Fremont, CA (US); Nardo B. Catahan, Jr., S. San Francisco, CA (US); Richard Mark Exley, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 10/809,191

(22) Filed: Mar. 24, 2004

(65) Prior Publication Data

US 2004/0199489 A1 Oct. 7, 2004

Related U.S. Application Data

(60) Provisional application No. 60/457,463, filed on Mar. 24, 2003.

(51) Int. Cl.
*G06F 17/30* (2006.01)
(52) U.S. Cl. .................................. 707/104.1; 707/101
(58) Field of Classification Search ................ 707/101, 707/102, 103 Y, 103 X, 104.1; 705/4, 22, 705/26, 28, 29, 35, 39, 44
See application file for complete search history.

(56) References Cited

U.S. PATENT DOCUMENTS

| 6,336,124 | B1 * | 1/2002 | Alam et al. .................. 715/523 |
| 6,668,253 | B1 * | 12/2003 | Thompson et al. ........... 707/10 |
| 2002/0035431 | A1 * | 3/2002 | Ell ............................... 702/5 |
| 2002/0085020 | A1 * | 7/2002 | Carroll, Jr. .................. 345/700 |
| 2002/0138582 | A1 * | 9/2002 | Chandra et al. ............ 709/206 |
| 2002/0184148 | A1 * | 12/2002 | Kahn et al. ................... 705/40 |
| 2002/0188513 | A1 | 12/2002 | Gil et al. |
| 2002/0188538 | A1 * | 12/2002 | Robertson et al. ............ 705/35 |
| 2003/0163597 | A1 * | 8/2003 | Hellman et al. ............ 709/316 |

* cited by examiner

Primary Examiner—Leslie Wong
(74) Attorney, Agent, or Firm—Campbell Stephenson LLP

(57) ABSTRACT

Enterprise management information in a first format for use by a first computerized system is transformed into an intermediate format to readily make the stored enterprise management information available for use in a second computerized system that utilizes a second format. The intermediate format includes a plurality of custom data type elements that are adapted for capturing unique customer information that are relevant to the customer's business systems.

21 Claims, 32 Drawing Sheets

AddressCustomDataType

BalanceStatementCustomDataType

BillingProfileCustomDataType

BillOfMaterialComponentCustomDataType

BillOfMaterialCustomDataType

BusUnitCustomDataType

ContactOfCustomDataType

ContractCustomDataType

CreditBureauReportCustomDataType

CustomerOfCustomDataType

EmployeeOfCustomDataType

PersonCustomDataType

PolicyCustomDataType

PositionCustomDataType

RelatedToCustomDataType

RepresentedByCustomDataType

SecurityCustomDataType

ServiceRequestCustomDataType

SetOfBooksCustomDataType

OrgCustomDataType

PartyAuthenticationDataCustomDataType

PartyCustomDataType

LifePolicyCustomDataType

ListOfRelationshipCustomDataType

FunctionalAreaCustomDataType

HoldingCustomDataType

HouseholdCustomDataType

DATA MODELING USING CUSTOM DATA TYPES

CROSS REFERENCE TO RELATED APPLICATIONS

This application comer claims the benefit of U.S. Provisional Patent Application No. 60/457,463 filed Mar. 24, 2003, entitled, "CUSTOM COMMON OBJECT," by Barnes-Leon et al., and which is hereby incorporated by reference in its entirety.

TECHNICAL FIELD

The present invention is directed to the field of data modeling, and more specifically to customization data types that can be referenced by other data objects in the data model.

BACKGROUND

An enterprise may employ various systems to manage various aspects of human resources and enterprise resources. The various systems can include Human Resource Management (HRM) systems, Employee Relationship Management (ERM) systems, Enterprise Resources Planning (ERP) systems, supply chain management (SCM) and warehouse management (WMS), and custom applications for the purpose of sharing data. Such an enterprise system is herein referred to as a multi-application integration system (MAIS). The various systems in the MAIS need to communicate data to each other. However, the users of enterprise data in the back-office typically store data in forms usable by the back-office computerized system, which often differ significantly from the forms usable with front-office computerized systems.

Thus, when some or all aspects of enterprise data are managed by both back-office and front-office computerized systems, there is a need to synchronize the enterprise data in both computerized systems.

Thus, in order for front-office computerized systems to communicate with back-office computerized systems that are already being used, the user must manually regenerate data from the back-office computerized systems in forms usable by the front-office computerized systems. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated and efficient approach for transforming data used by a back-office computerized system for use by a front-office computerized system, or vice versa, is needed.

DETAILED DESCRIPTION

Figure 1A:
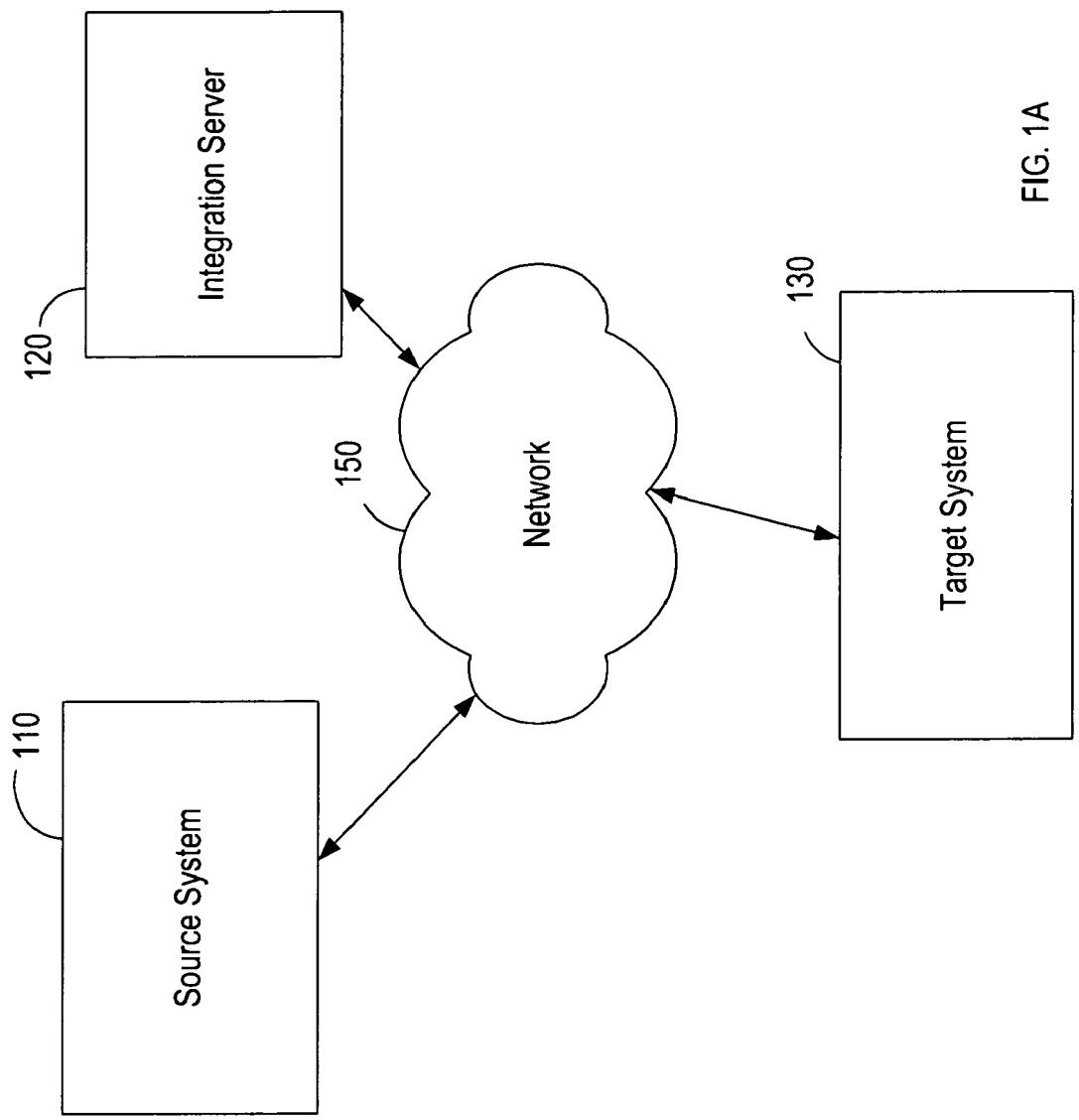
FIG. 1A is a high-level network diagram showing aspects of a computerized environment in which the facility operates, according to certain embodiments.

All changes in the enterprise information need to be captured and made accessible to all relevant computer applications that the enterprise uses to manage various aspects of enterprise resources. Thus, a common data storage model is needed for enabling users of the relevant computer applications to have the same view of the enterprise information across the various computer applications.

According to certain embodiments, the common data storage model utilizes common objects that provide defined data structures that can be used as conduits for passing enterprise information from one computerized system to another in the enterprise multi-application integration system (MAIS). Such a data structure is a common structure that can be mapped to multiple distinct enterprise systems purchased from different vendors. Such a common data storage model is herein referred to as a common object data model or an MAIS data model.

One aspect of the common object data model is the design and utilization of "Custom" common objects. The "Custom" common objects provide data types that can be used to capture unique customer information that is relevant to the customer's business systems.

The Custom data types may be defined in a Custom common object schema, herein referred to as "custom.xsd". Most common objects within the multi-application integration system (MAIS) data model has at least one reference to custom.xsd.

The MAIS data model provides general representations of most data objects used in day-to-day business (e.g. Sales Orders, Customer records, Product information, etc.). Due to the uniqueness of each business in the global economy, the MAIS data model, without more, usually does not meet every need of all customers. Thus, Custom common objects are provided to MAIS clients for holding, processing, and transporting the customer's unique information using the MAIS product.

The secondary problem that is associated with customer-defined data models in software applications is the adverse impact on the ability to upgrade the software when new releases come out. The design of custom common objects in custom.xsd used in MAIS solves the problem of customized data models impeding the upgrades of MAIS. Customers can customize the data model using custom.xsd, and still be able to accept updates and upgrades of the MAIS data model. This is possible because the custom.xsd will contain all customer-specific additions to the data model, and all of the other MAIS common objects simply refer to the custom.xsd to get the customer-specific data structures. In short, the core MAIS data model is typically need not be modified by the customer because all data structure additions are made in the custom.xsd.

In contrast, in other software applications, the customizations made at the time of implementation are often tagged and logged so they can be identified and re-implement when it comes time to upgrade. However, such an approach does not significantly reduce the amount of re-work associated with upgrades. To explain, the tagging and logging simply identify how much work needs to be done, but in no way reduced the amount of the work when the software is upgraded.

Thus, custom data types are made available in each common object of MAIS. When a customer wishes to add data elements to any of the common objects used in the customer's business systems, the customer simply defines the new elements (&/or structure) in the appropriate custom data type within custom.xsd. The new definition is then available to the "calling" common object.

When enterprise information is passed from the back-office enterprise system to the front-office enterprise system, then the back-office enterprise system is referred to as the source system and the front-office enterprise system is referred to as the target system. On the other hand, when enterprise information is passed from the front-office enterprise system to the back-office enterprise system, then the front-office enterprise system is referred to as the source system and the back-office enterprise system is referred to as the target system.

A software facility (hereafter "the facility") for automatically converting enterprise information, is described. In some embodiments, the facility converts enterprise information from a form used by the source system to a form used by the target system.

In some embodiments, such as embodiments adapted for converting enterprise information in the first source format, the facility converts enterprise information by converting the enterprise information that is in the first source format into an intermediate format. The intermediate format includes a plurality of custom data type elements that are adapted for capturing unique customer information that are relevant to the customer's business systems. The intermediate format is then used to convert the enterprise information into the target format.

By performing such conversions, embodiments of the facility enable a user of a first computerized system who has stored enterprise information in a first format for use by the first computerized system to readily make the stored enterprise information available for use in a second computerized system that utilizes a second format in a cost-efficient and time-efficient manner.

FIG. 1A is a high-level network diagram showing aspects of a typical hardware environment in which the facility operates. FIG. 1A shows a source system 110, a target system 130, an integration server 120 and a network 150. Source system 110 stores enterprise information in a source format. There may be more than one source system. Target system 130 stores enterprise information in a target format. There may be more than one target system.

The facility (not shown) converts some or all the enterprise information that is in the source format into the target format by using an intermediate format of the enterprise information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 1B:
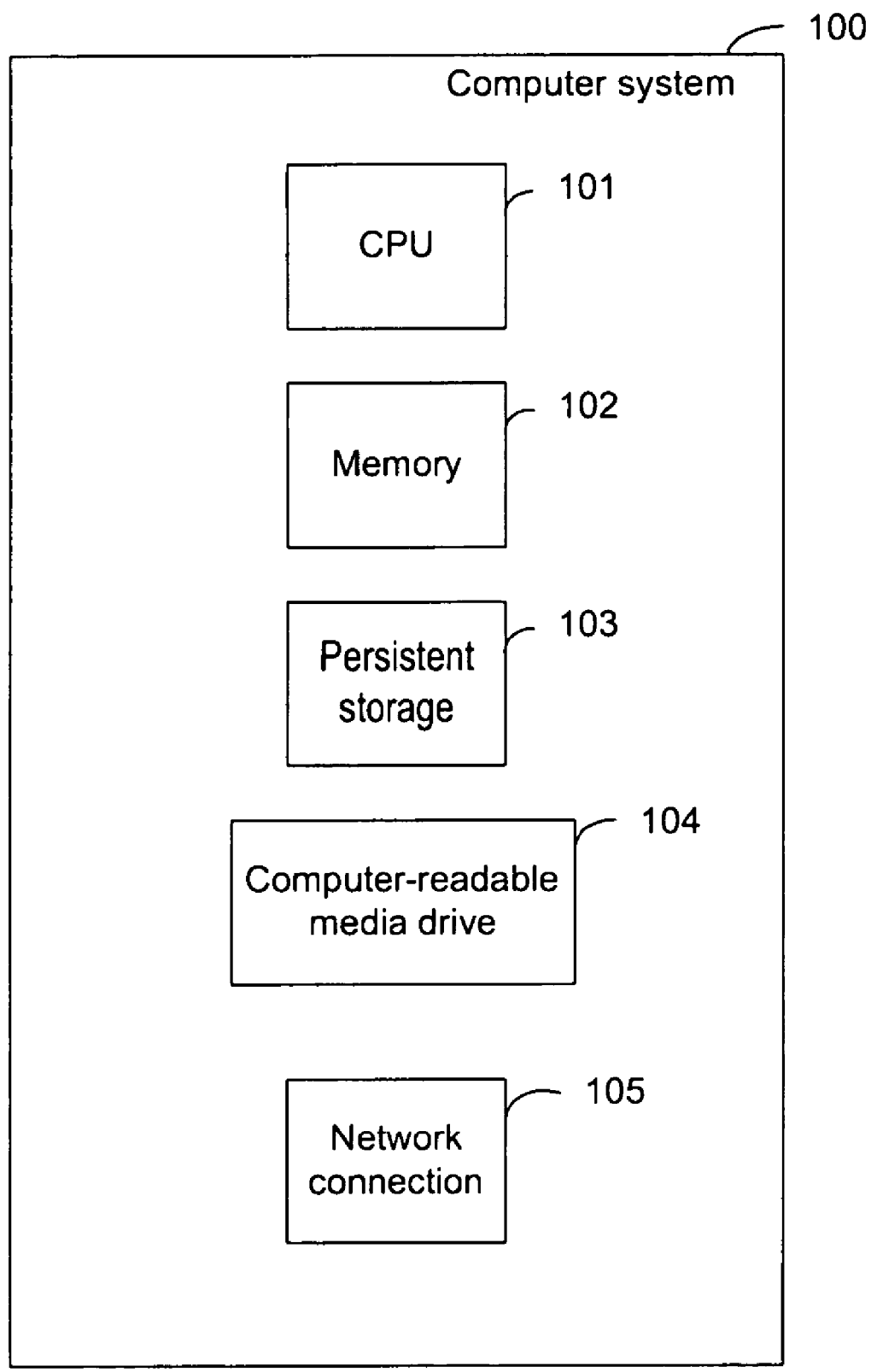
FIG. 1B is a block diagram showing some of the components typically incorporated in at least some of the computer systems and other devices on which the facility executes.

FIG. 1B is a block diagram showing some of the components typically incorporated in at least some of the computer systems and other devices on which the facility executes, including some or all of the server and client computer systems shown in FIG. 1A. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform enterprise information from a number of different source systems and from a number of different source software packages to a number of target systems and/or to a number of target software packages.

The intermediate data structures used by the facility include "custom" common data structures. Custom common data structures are used for capturing unique customer information and that can be referenced by other intermediate data structures. For example, a product data structure in the common object model may include a "custom data" element. The custom data element may be used by the customer to define additional data fields associated with the customer's product, as one example.

Figure 1C:
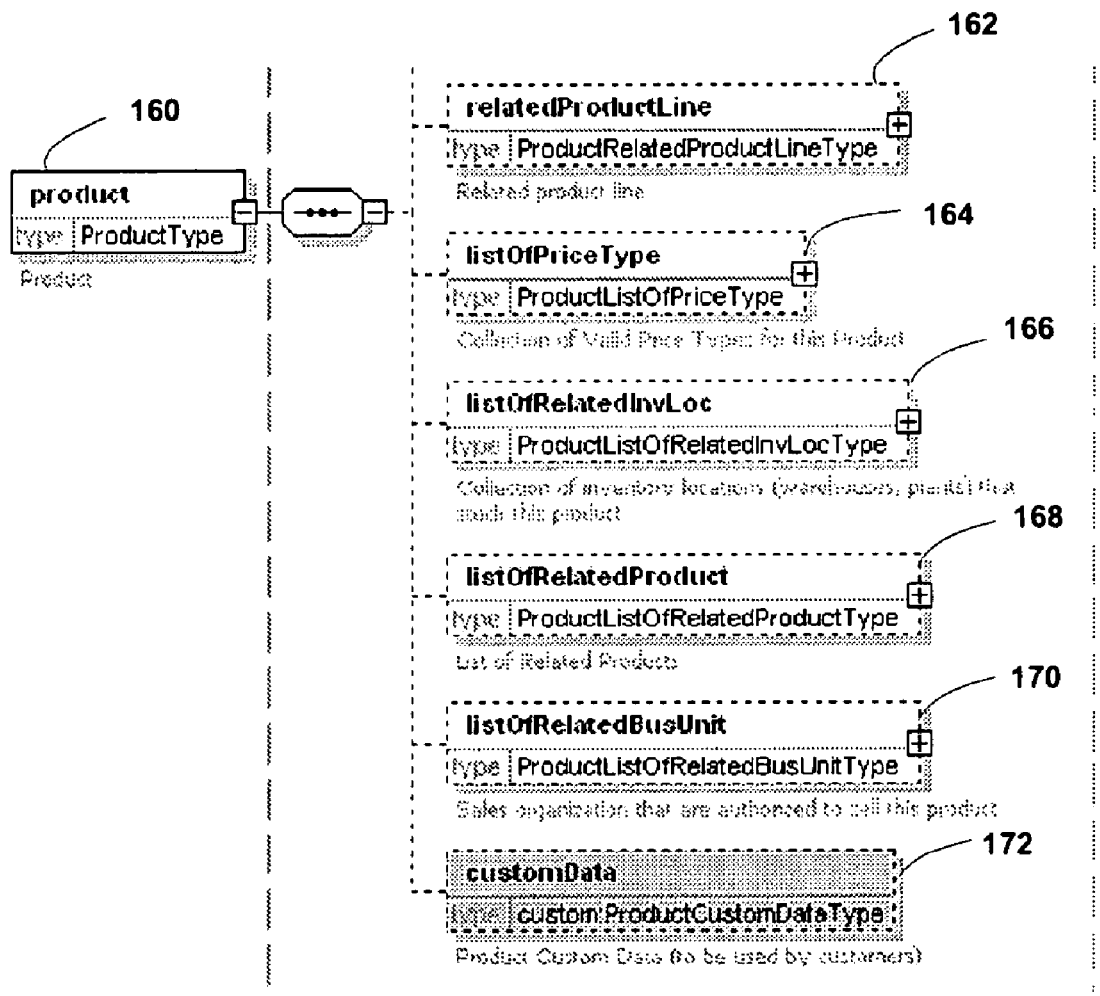
FIG. 1C illustrates a product data structure 160.

FIG. 1C illustrates a product data structure 160. Product data structure 160 includes a related product line element 162, a list of price type element 164, a list of related inventory location element 166, a list of related product element 168, a list of related business unit element 170 and a "product custom data" element 172 product data structure 160 refers to the Custom common object schema through the product custom data element 172.

In the event that the customer wishes to add additional data fields to product data structure 160, the customer may do so by simply modifying the product custom data type in the Custom common object schema.

Custom common data structures include one or more elements selected from a group comprising: an application element, a fault handler input element, a fault handler output element, a fault transformer input element, a fault transformer output element, a list of application instance element, a list of application type element, a list of ID cross-reference element, a list of ID cross-reference data element, a list of message definition element, a list of message text element, a list of value cross-reference element, and a list of value cross-reference data element, a message element, a message set element, an activity type element, an address type element, an alternate ID type element, a communication data type element, a data cleansing data type element, and a payment card type element.

Figure 2:
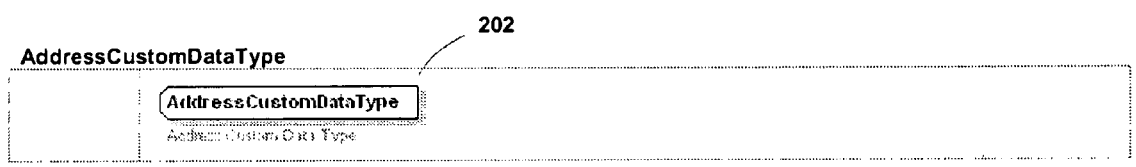
FIG. 2 shows an address custom data type element 202.

FIG. 2 shows an address custom data type element 202.

Figure 3:
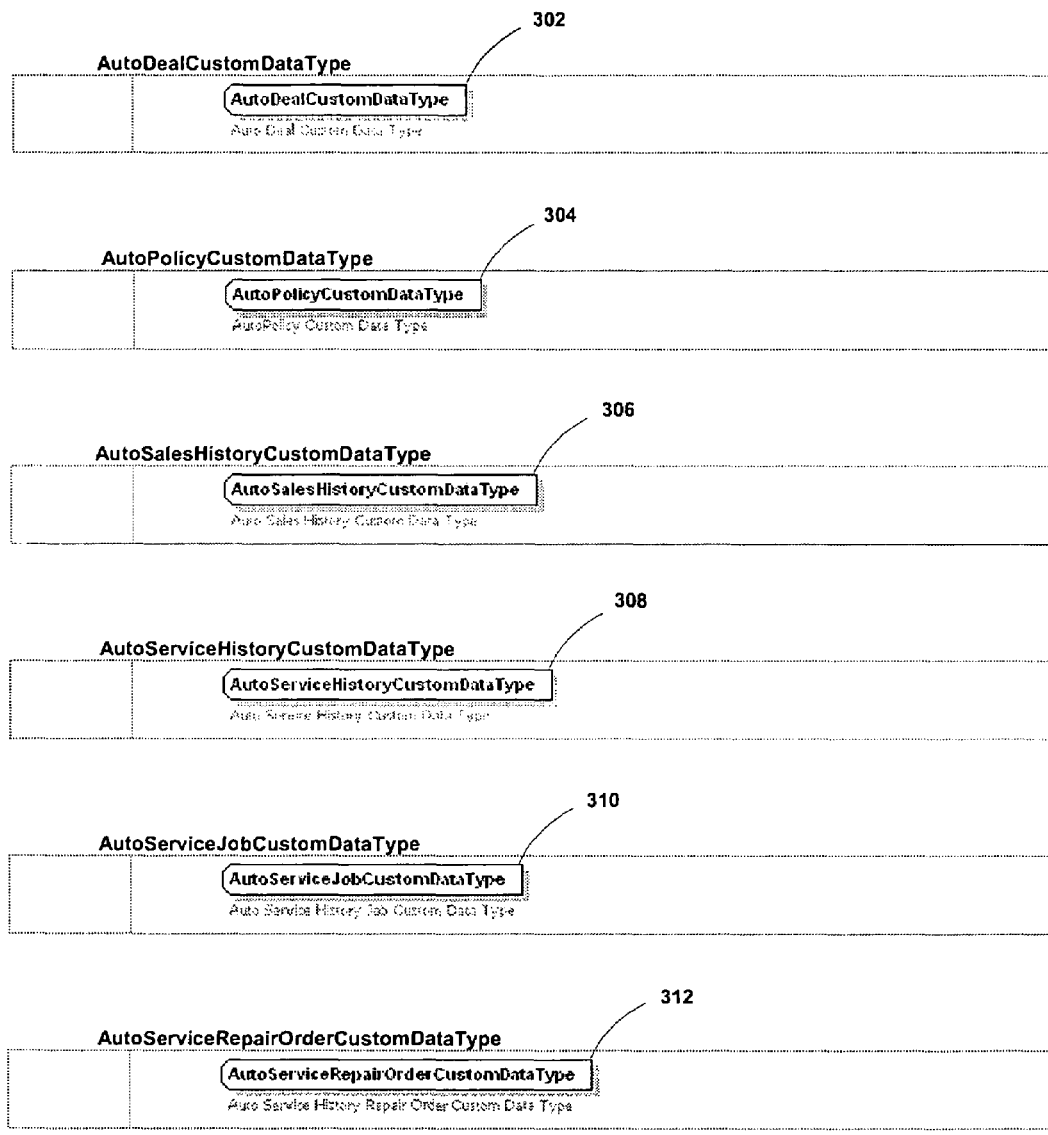
FIG. 3 shows custom data type elements associated with automobile business.

FIG. 3 shows custom data type elements associated with automobile business. The custom data type elements include an auto deal custom data type element 302, an auto policy custom data type element 304, an auto sales history custom data type element 306, an auto service history custom data type element 308, an auto service job custom data type element 310, and an auto service repair order custom data type element 312.

Figure 4:
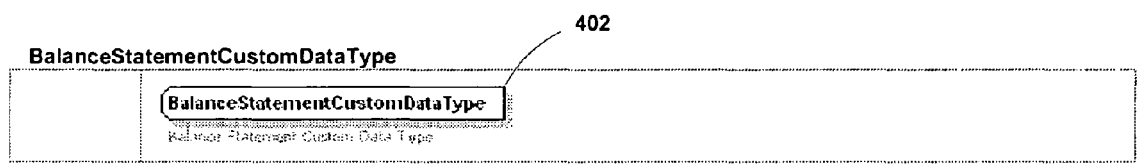
FIG. 4 shows a balance statement custom data type element 402.

FIG. 4 shows a balance statement custom data type element 402.

Figure 5A:
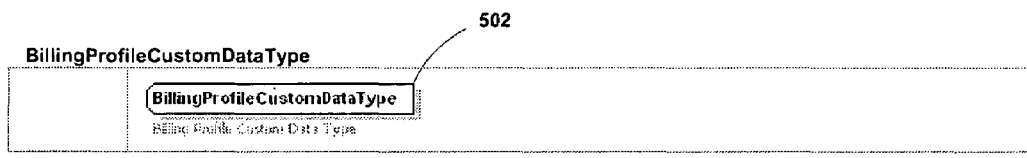
FIG. 5A shows a billing profile custom data type element 502.

FIG. 5A shows a billing profile custom data type element 502.

Figure 5B:
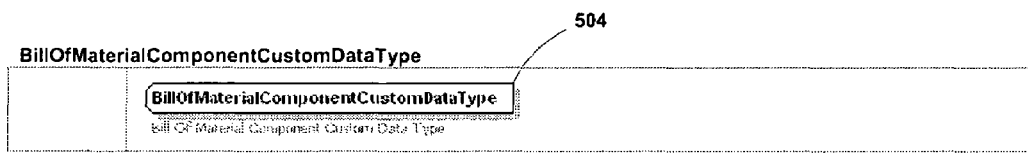
FIG. 5B shows custom data type element associated with bill of materials.
Figure 5B:
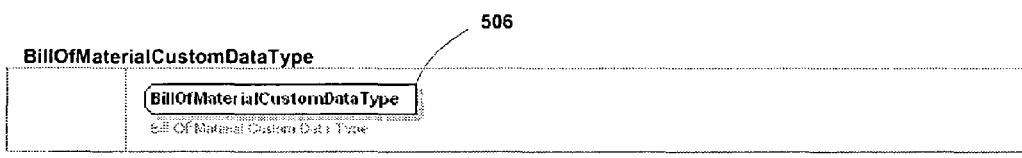

FIG. 5B shows custom data type element associated with bill of materials. The custom data type elements include a bill of material component custom data type element 504, and a bill of material custom data type element 506.

Figure 6:
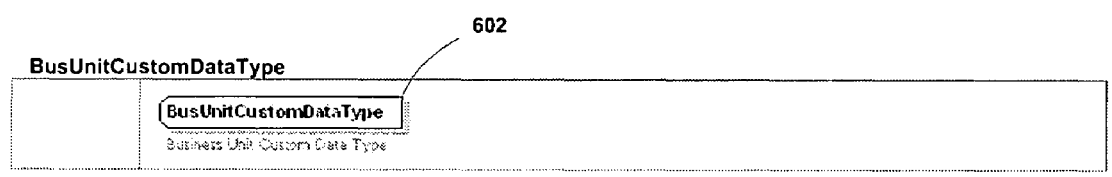
FIG. 6 shows a business unit custom data type element 602.

FIG. 6 shows a business unit custom data type element 602.

Figure 7:
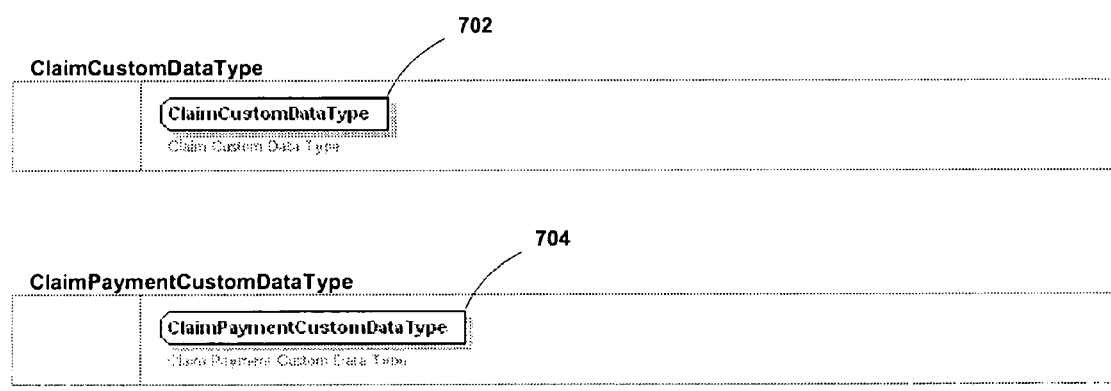
FIG. 7 shows custom data type elements associated with claims.

FIG. 7 shows a claim custom data type element 702, and a claim payment custom data type element 704.

Figure 8:
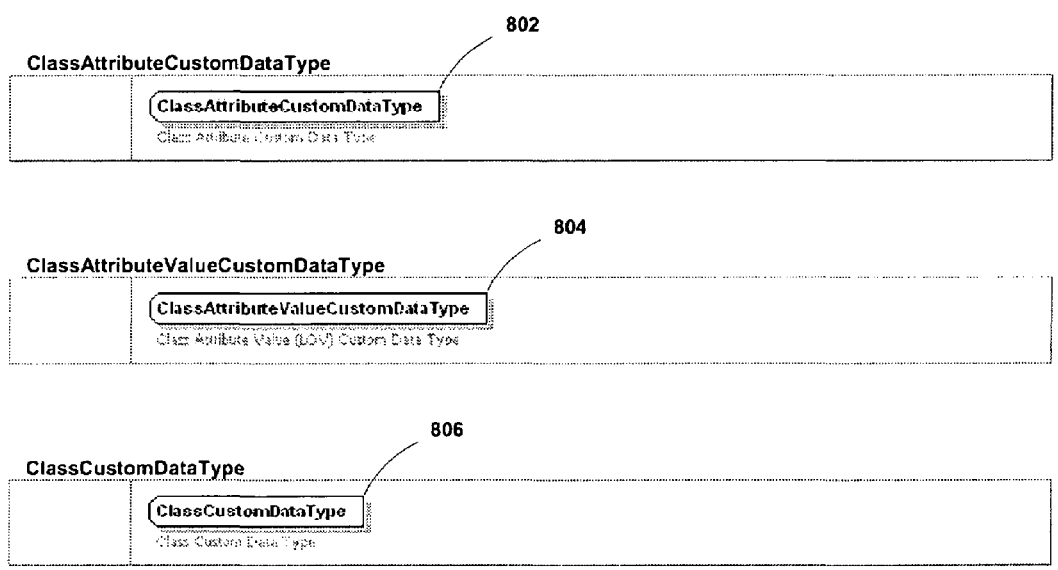
FIG. 8 shows custom data type elements associated with class.

FIG. 8 shows a class attribute custom data type element 802, a class attribute value custom data type element 804, and a class custom data custom data type element 806.

Figure 9A:
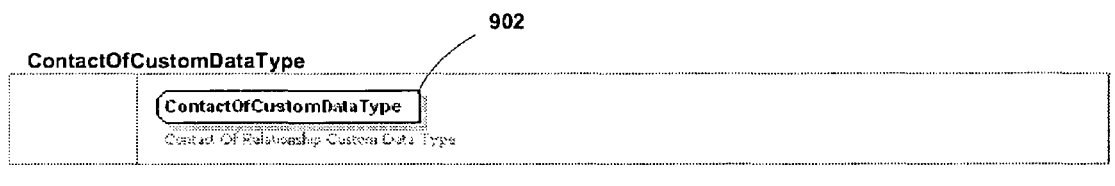
FIG. 9A shows a contact-of custom data type element 902.

FIG. 9A shows a contact-of custom data type element 902.

Figure 9B:
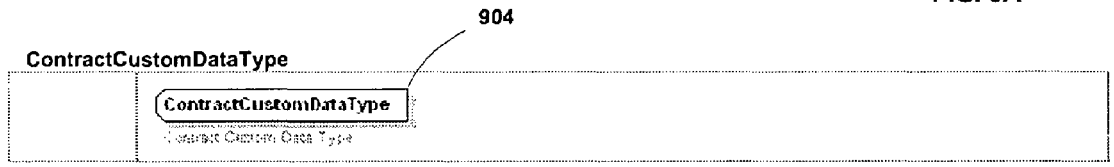
FIG. 9B shows a contract custom data type element 904.

FIG. 9B shows a contract custom data type element 904.

Figure 10:
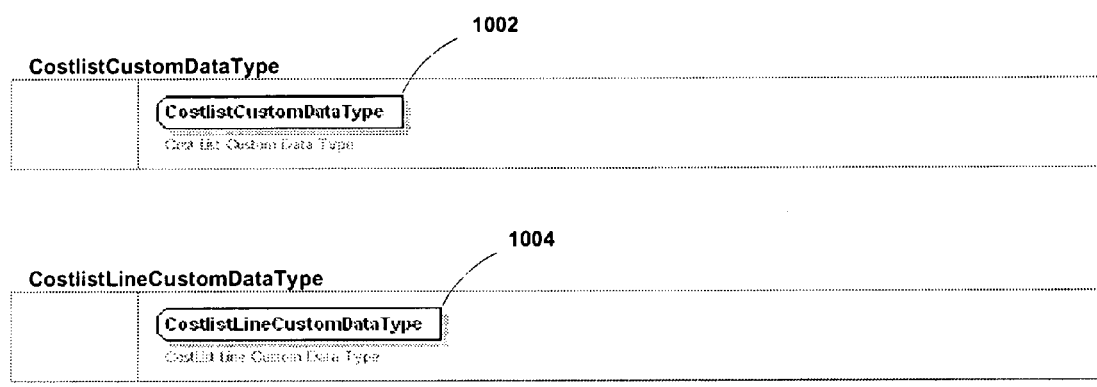
FIG. 10 shows custom data type elements associated with cost.

FIG. 10 shows a cost list custom data type element 1002, and a cost list line custom data type element 1004.

Figure 11:
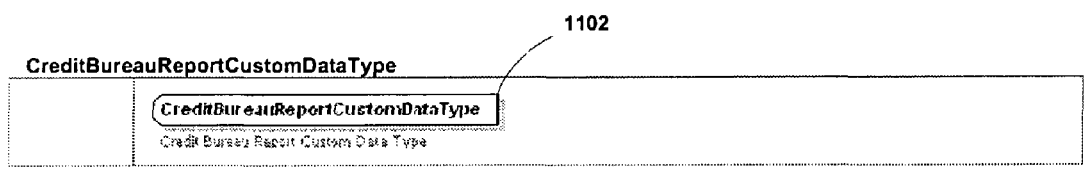
FIG. 11 shows a credit bureau report custom data type element 1102.

FIG. 11 shows a credit bureau report custom data type element 1102.

Figure 12:
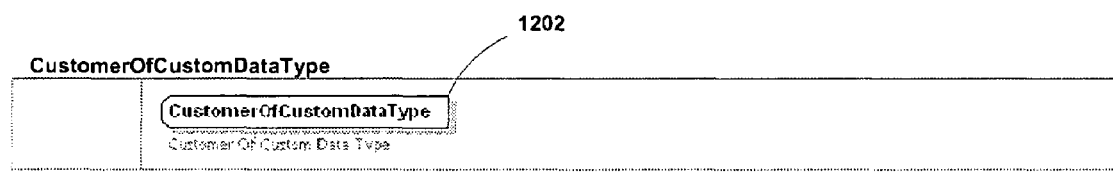
FIG. 12 shows a customer-of custom data type element 1202.

FIG. 12 shows a customer-of custom data type element 1202.

Figure 13:
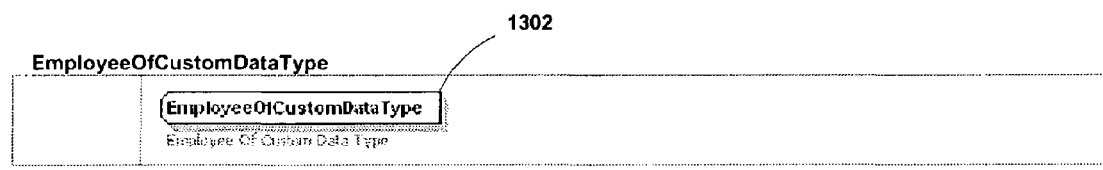
FIG. 13 shows an employee-of custom data type element 1302.

FIG. 13 shows an employee-of custom data type element 1302.

Figure 14:
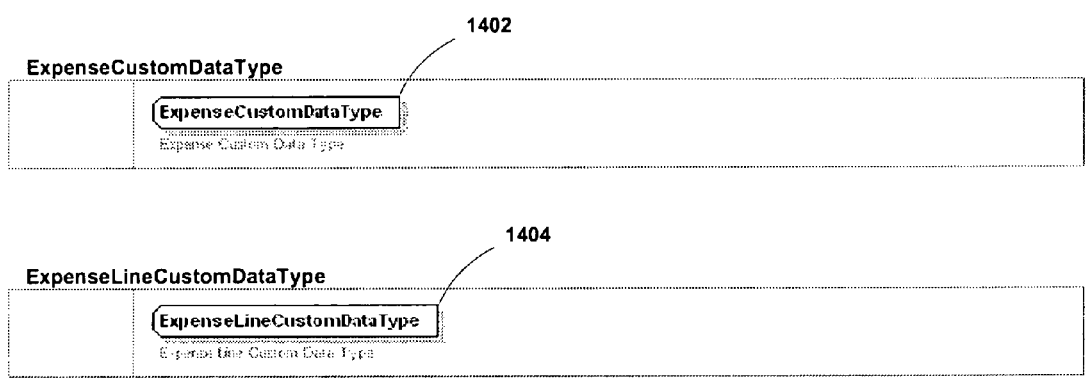
FIG. 14 shows custom data type elements associated with expense.

FIG. 14 shows an expense custom data type element 1402, and an expense line custom data type element 1404.

Figure 15:
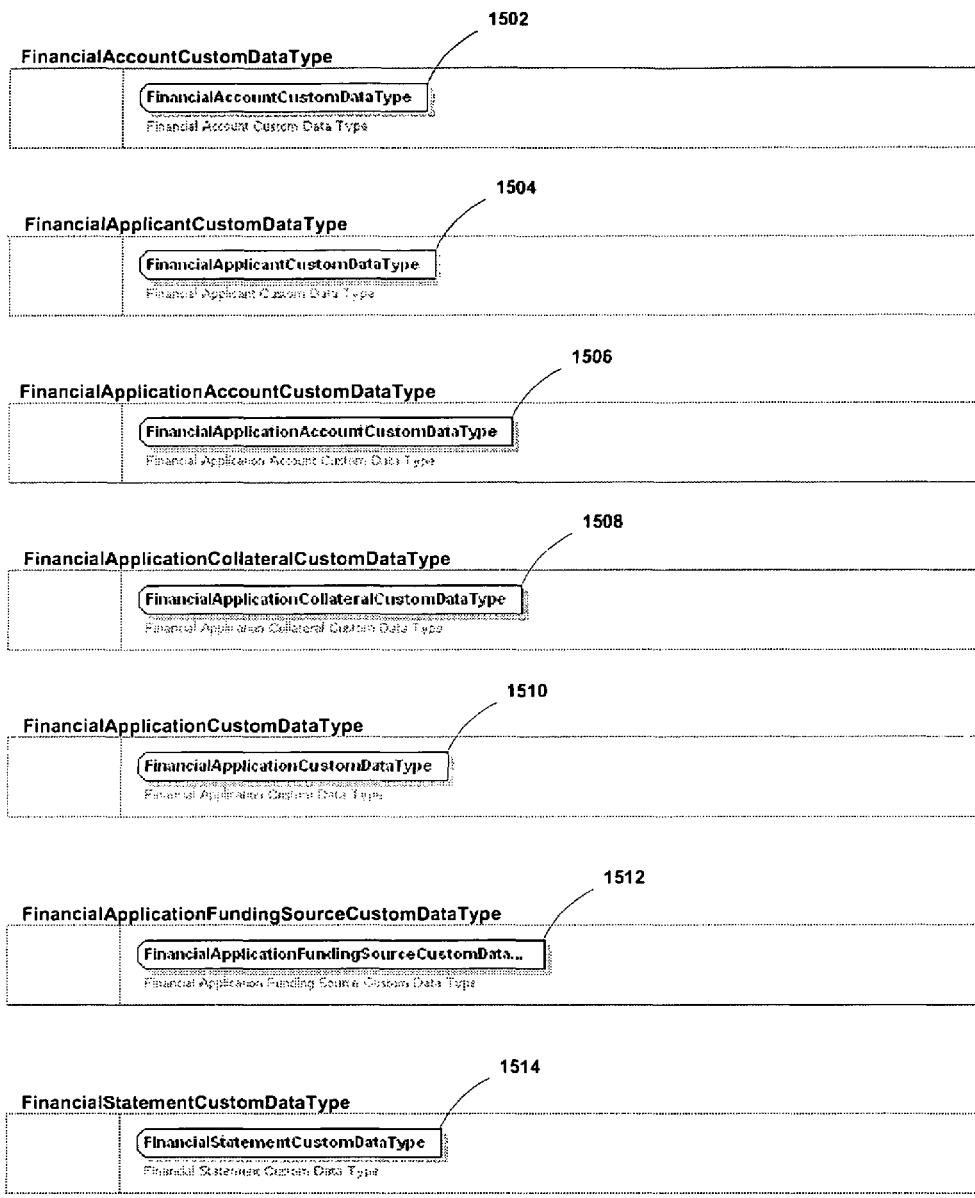
FIG. 15 shows custom data type elements associated with finance.

FIG. 15 shows a financial account custom data type element 1502, a financial applicant custom data type element 1504, a financial application account custom data type element 1506, a financial application collateral custom data type element 1508, a financial application custom data type element 1510, a financial application funding source custom data type element 1512, and a financial statement custom data type element 1514.

Figure 16:
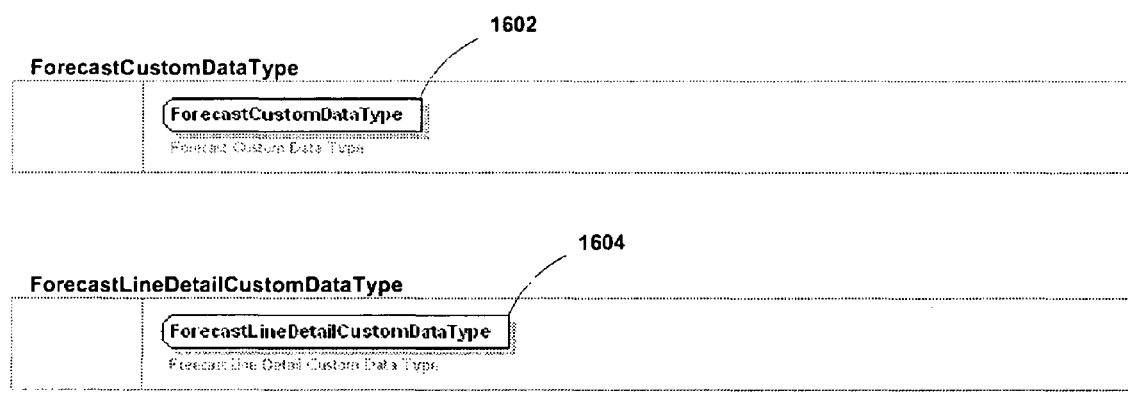
FIG. 16 shows custom data type elements associated with forecast.

FIG. 16 shows a forecast custom data type element 1602, and forecast line detail custom data type element 1604.

Figure 17:
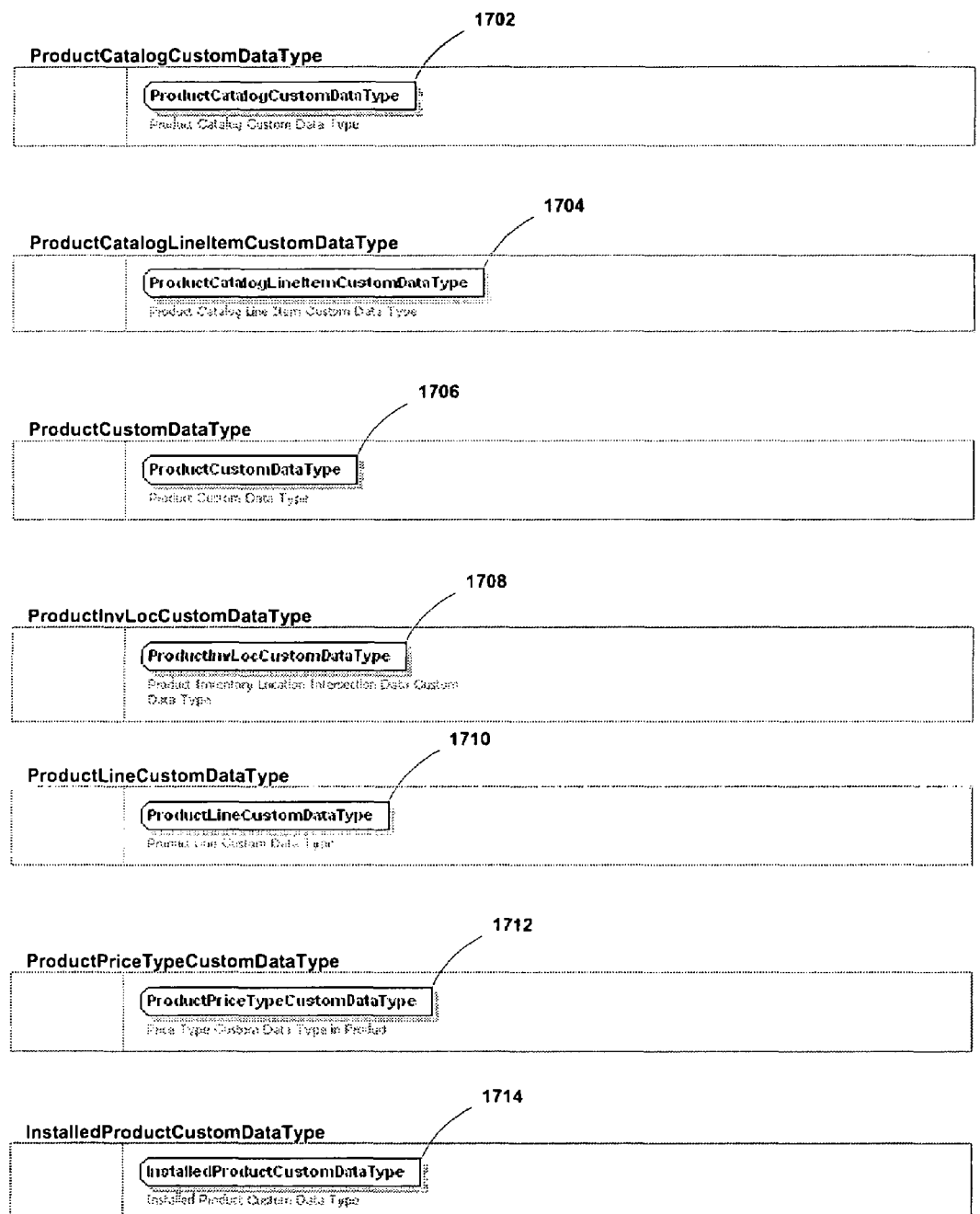
FIG. 17 shows custom data type elements associated with products.

FIG. 17 shows a product catalog custom data type element 1702, a product catalog line item custom data type element 1704, a product custom data type element 1706, a product inventory location custom data type element 1708, a product line custom data type element 1710, a product price custom data type element 1712, and an installed product custom data type element 1714.

Figure 18:
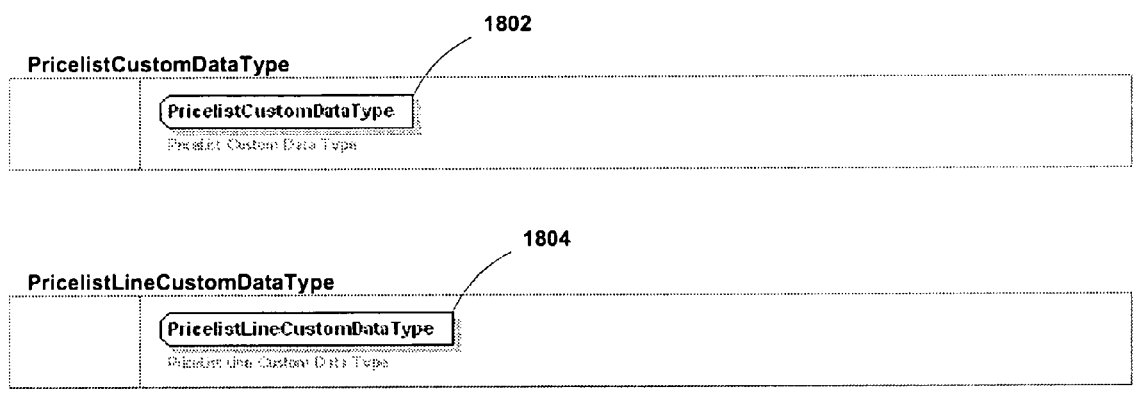
FIG. 18 shows custom data type elements associated with prices.

FIG. 18 shows a price list custom data type element 1802, and a price list line custom data type element 1804.

Figure 19:
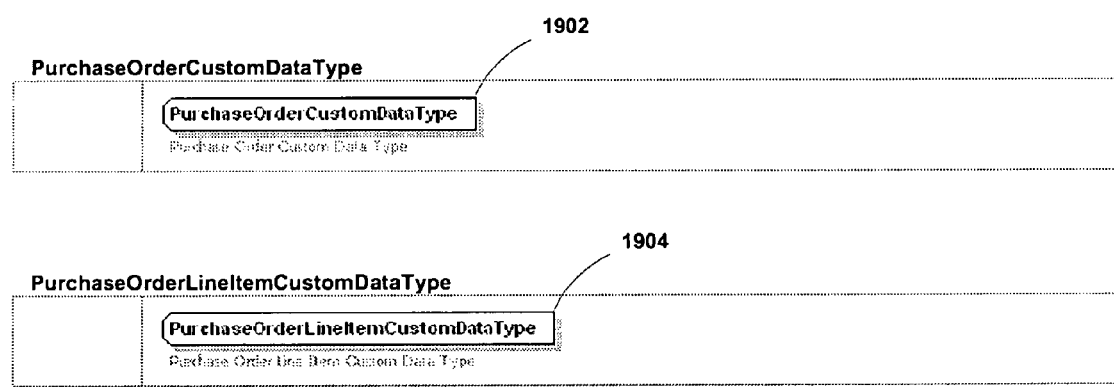
FIG. 19 shows custom data type elements associated with purchases.

FIG. 19 shows a purchase order custom data type element 1902, and a purchase order line item custom data type element 1904.

Figure 20:
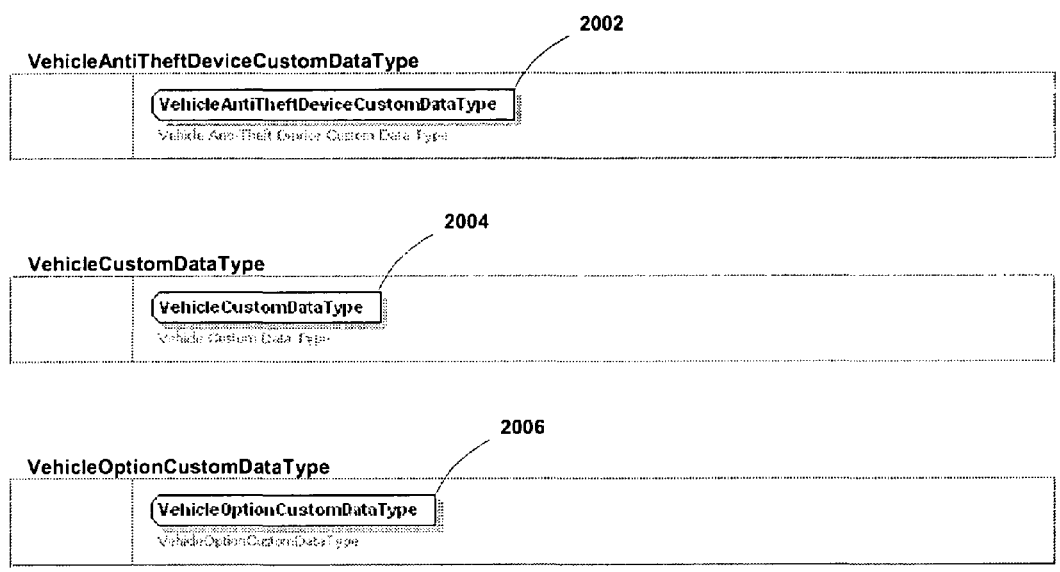
FIG. 20 shows custom data type elements associated with vehicles.

FIG. 20 shows a vehicle anti theft device custom data type element 2002, a vehicle custom data type element 2004, and a vehicle option custom data type element 2006.

Figure 21A:
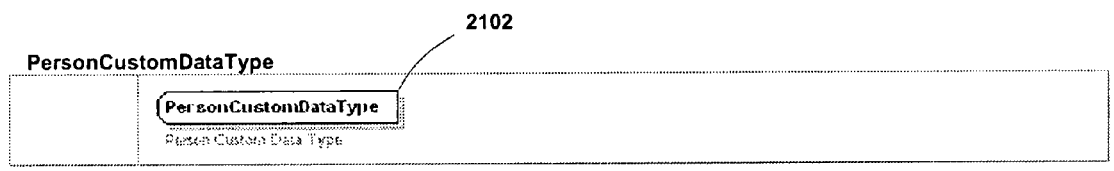
FIG. 21A shows a person custom data type element 2102.

FIG. 21A shows a person custom data type element 2102.

Figure 21B:
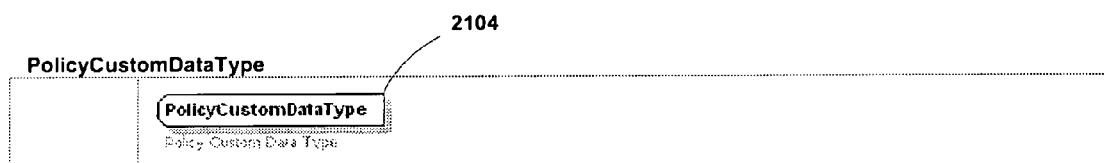
FIG. 21B shows a policy custom data type element 2104.

FIG. 21B shows a policy custom data type element 2104.

Figure 21C:
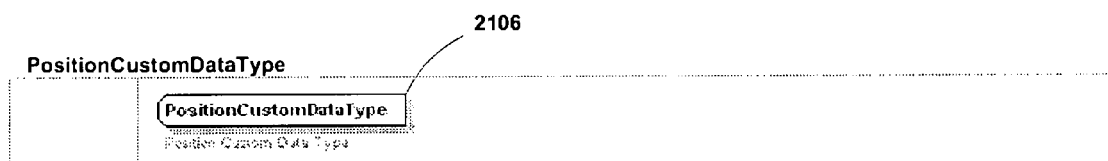
FIG. 21C shows a position custom data type element 2106.

FIG. 21C shows a position custom data type element 2106.

Figure 22A:
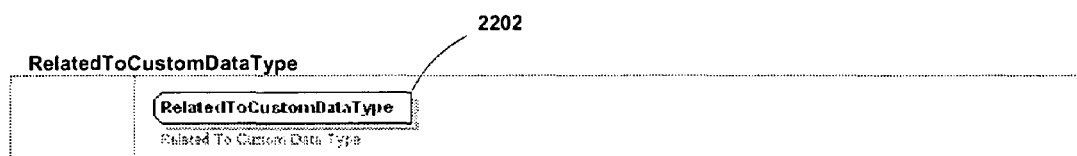
FIG. 22A shows a related-to custom data type element 2202.

FIG. 22A shows a related-to custom data type element 2202.

Figure 22B:
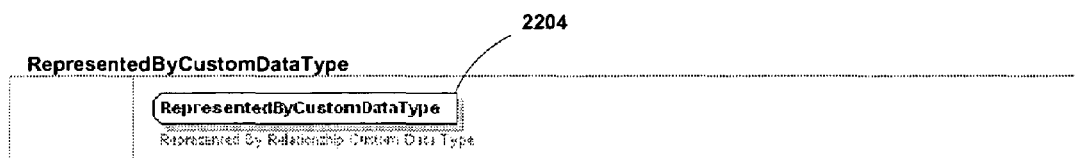
FIG. 22B shows a represented-by custom data type element 2204.

FIG. 22B shows a represented-by custom data type element 2204.

Figure 22C:
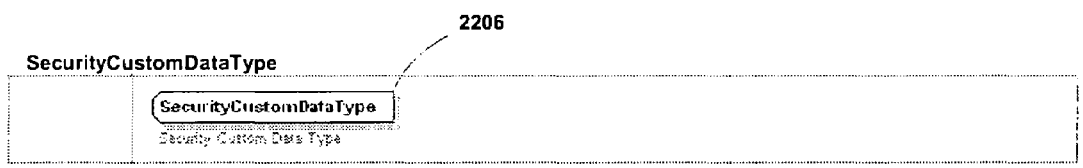
FIG. 22C shows a security custom data type element 2206.

FIG. 22C shows a security custom data type element 2206.

Figure 22D:
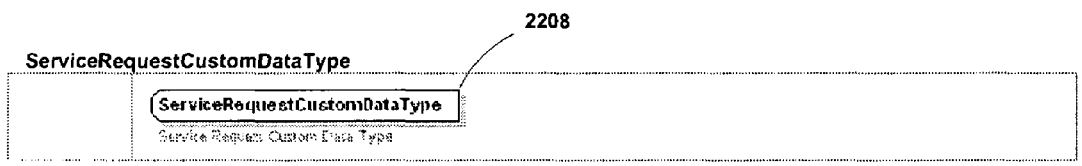
FIG. 22D shows a service request custom data type element 2208.

FIG. 22D shows a service request custom data type element 2208.

Figure 22E:
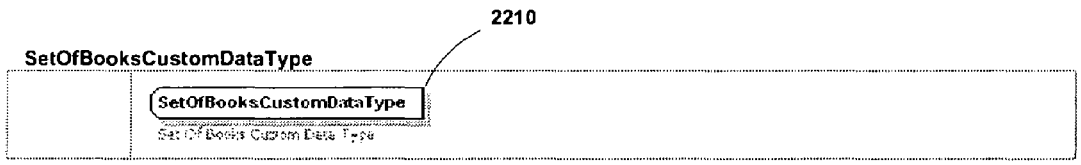
FIG. 22E shows a set of books custom data type element 2210.

FIG. 22E shows a set of books custom data type element 2210.

Figure 23:
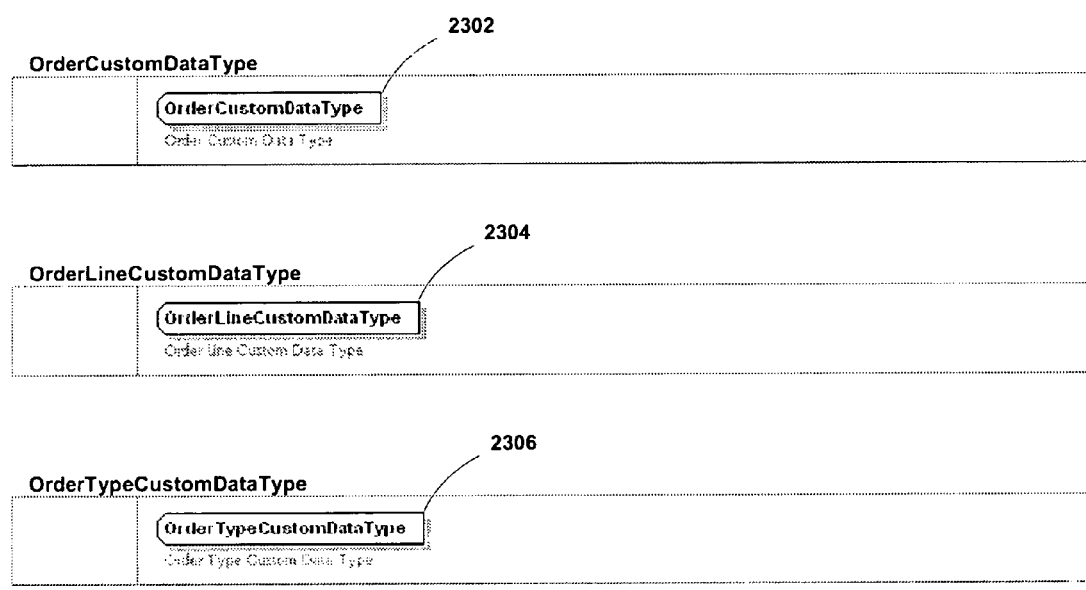
FIG. 23 shows custom data type elements associated with orders.

FIG. 23 shows an order custom data type element 2303, an order line custom data type element 2304, and an order type custom data type element 2306.

Figure 24A:
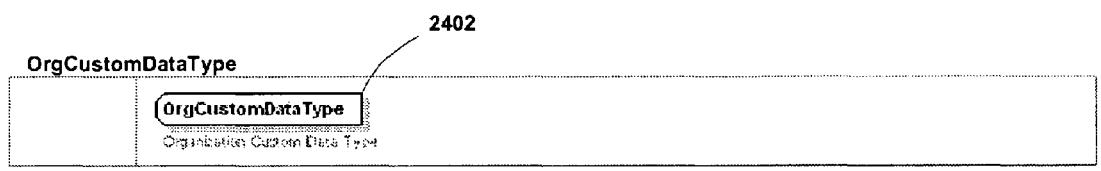
FIG. 24A shows an organization custom data type element 2402.

FIG. 24A shows an organization custom data type element 2402.

Figure 24B:
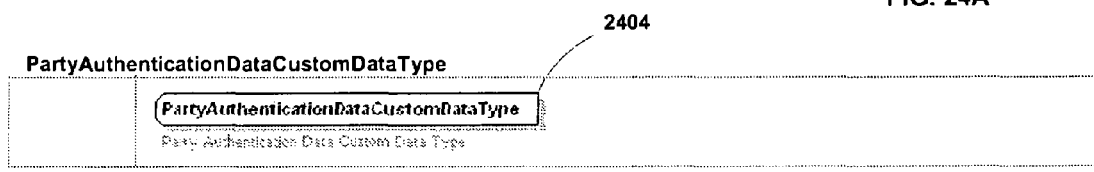
FIG. 24B shows custom data type elements associated with party.
Figure 24B:

FIG. 24B shows a party authentication custom data type element 2404, and a party custom data type element 2406.

Figure 25:
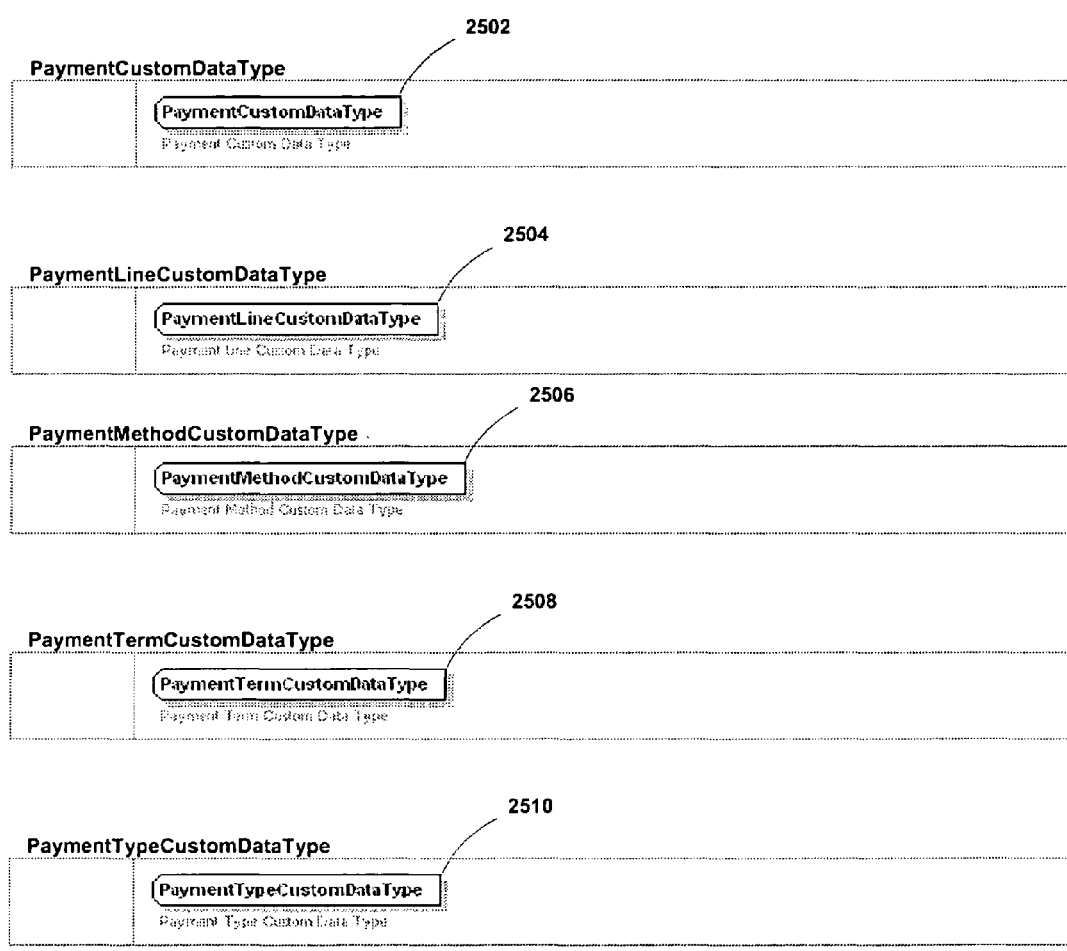
FIG. 25 shows custom data type elements associated with payment.

FIG. 25 shows a payment custom data type element 2502, a payment line custom data type element 2504, a payment method custom data type element 2506, a payment term custom data type element, 2508 and a payment type custom data type element 2510.

Figure 26:
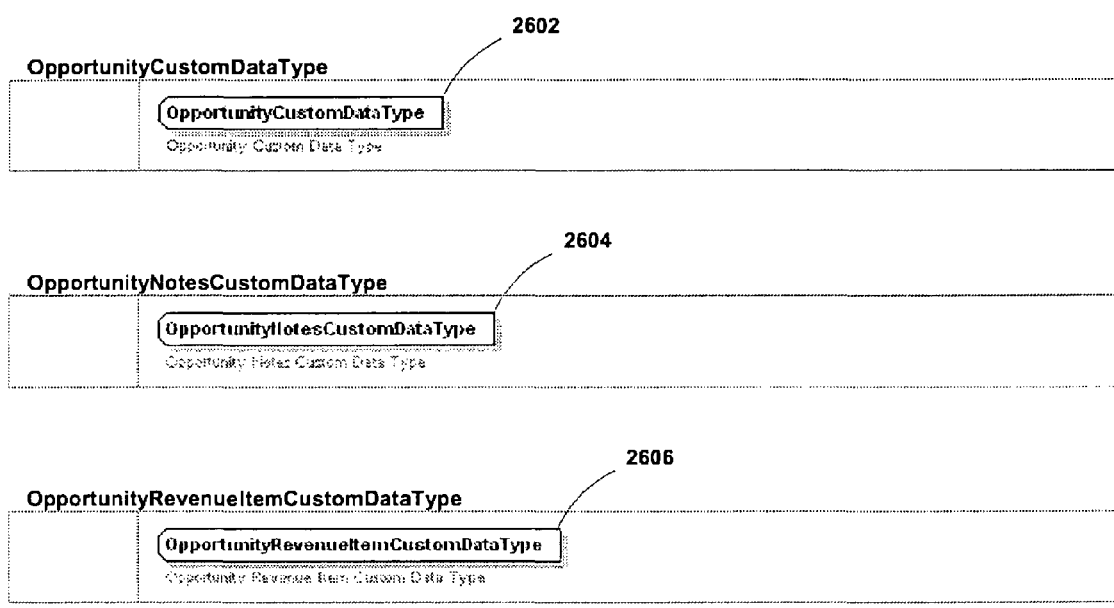
FIG. 26 shows custom data type elements associated with opportunity.

FIG. 26 shows an opportunity custom data type element 2603, an opportunity notes custom data type element 2604, and an opportunity revenue item custom data type element 2606.

Figure 27:
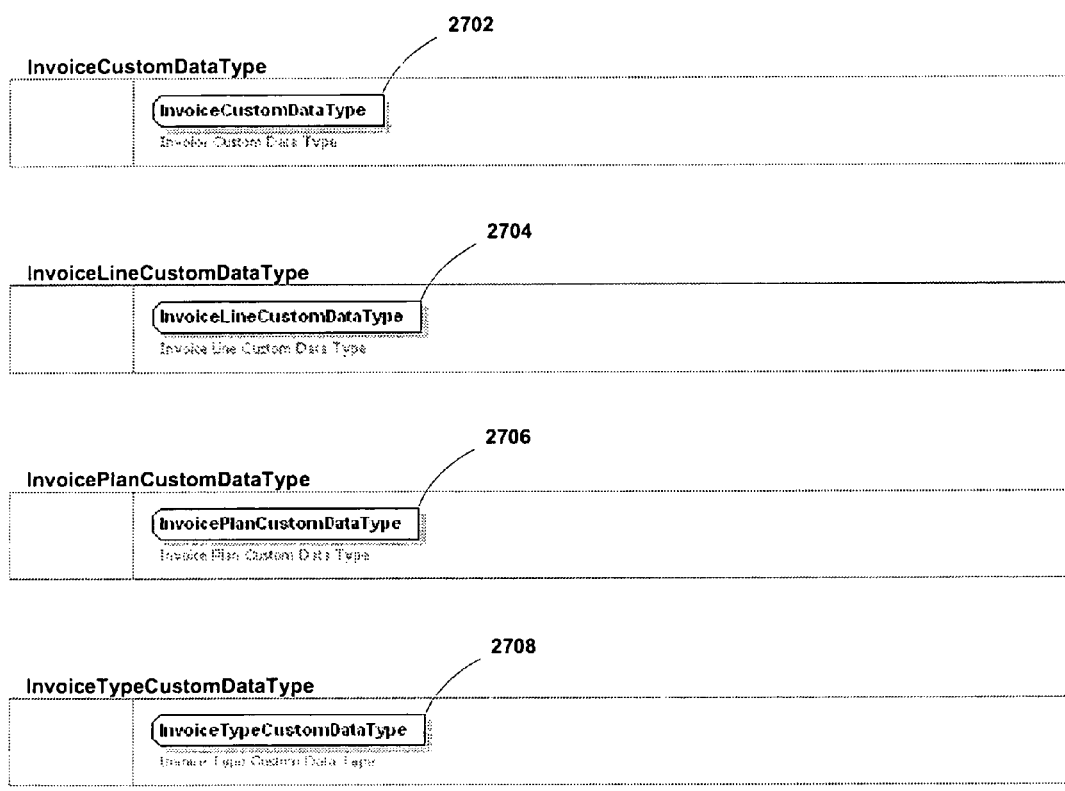
FIG. 27 shows custom data type elements associated with invoices.

FIG. 27 shows an invoice custom data type element 2702, an invoice line custom data type element 2704, an invoice plan custom data type element 2706, and an invoice type custom data type element 2708.

Figure 28A:
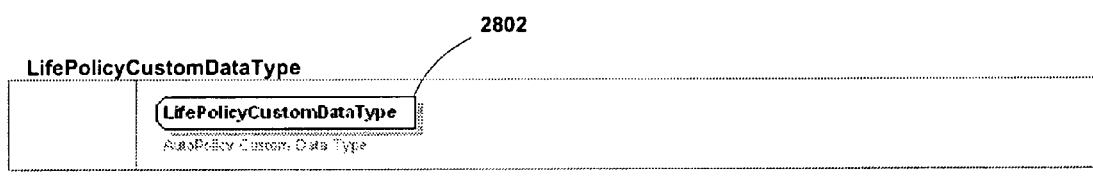
FIG. 28A shows a life policy custom data type element 2802.

FIG. 28A shows a life policy custom data type element 2802.

Figure 28B:
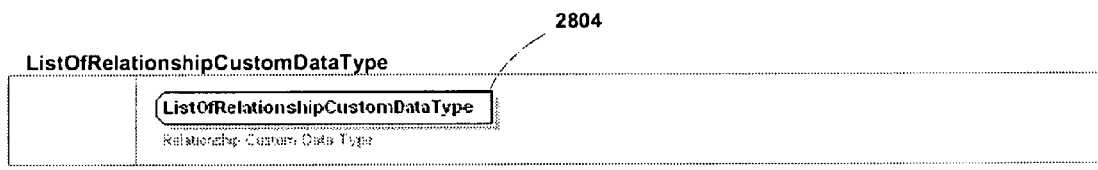
FIG. 28B shows a list of relationship custom data type element 2804.

FIG. 28B shows a list of relationship custom data type element 2804.

Figure 29:
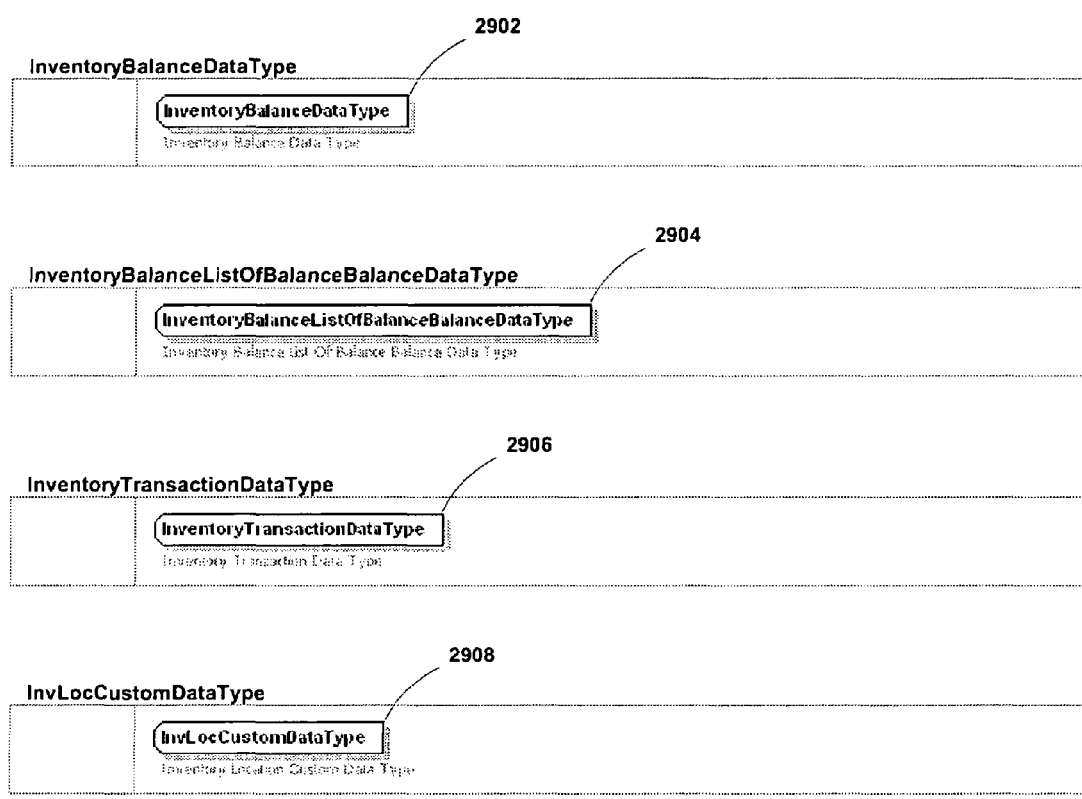
FIG. 29 shows custom data type elements associated with inventory.

FIG. 29 shows an inventory balance custom data type element 2902, an inventory balance list of balance balance custom data type element 2904, an inventory transaction custom data type element 2906, and an inventory location custom data type element 2908.

Figure 30A:
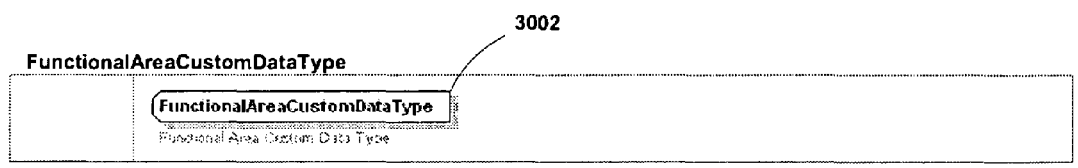
FIG. 30A shows a functional area custom data type element 3002.

FIG. 30A shows a functional area custom data type element 3002.

Figure 30B:
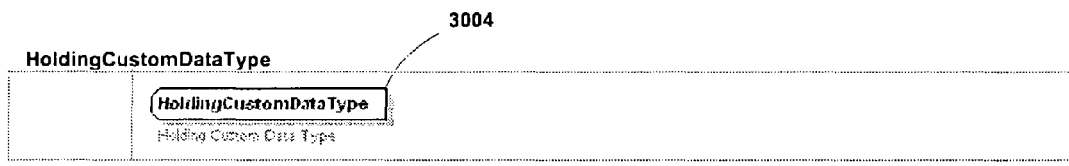
FIG. 30B shows a holding custom data type element 3004.

FIG. 30B shows a holding custom data type element 3004.

Figure 30C:
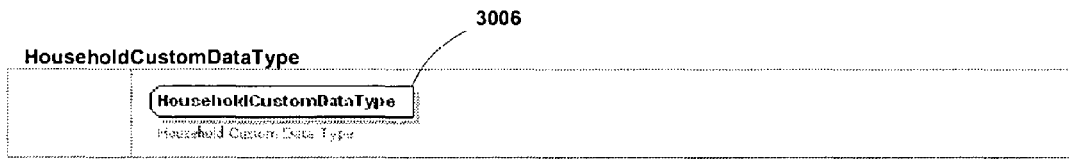
FIG. 30C shows a household custom data type element 3006.

FIG. 30C shows a household custom data type element 3006.

It will be appreciated by those skilled in the art that the above-described facility may be straightforwardly adapted or extended in various ways. For example, the facility may be used to transform various other kinds of enterprise information, and may be used to transform enterprise information between a variety of other formats.

In the foregoing specification, embodiments of the invention have been described with reference to numerous specific details that may vary from implementation to implementation. Thus, the sole and exclusive indicator of what the invention is and what is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A method in a computing system for managing enterprise data, the method comprising:
   extracting first enterprise information in a first form that is associated with a first source computerized system;
   converting the first enterprise information in the first form into corresponding first enterprise information that is in a second intermediate form; and
   converting the first enterprise information in the second intermediate form into first enterprise information that is in a target form that corresponds to a target computerized system, wherein information that is in the second intermediate form comprises a plurality of custom data type elements that are adapted for capturing customer information and that can be referenced by other data structures of the information that is in the second intermediate form, and wherein any modifications of the other data structures are independent of the custom data type elements;
   transmitting the first enterprise information that is in the target form to the target computerized system for processing therein;
   converting the first enterprise information in the second intermediate form into first enterprise information that is in a second target form that corresponds to a second target computerized system;
   extracting second enterprise information in a third form that is associated with a second source computerized system that is distinct from the first source computerized system, wherein the third form is distinct from the first form;
   converting the second enterprise information in the third form into second enterprise information that is in the second intermediate form; and
   converting the second enterprise information in the second intermediate form into second enterprise information that is in the target form.

2. The method of claim 1, wherein the customer information includes information that defines specific aspects of the customer's business.

3. The method of claim 1, wherein the custom data type elements include one or more elements comprising:
   an address custom data type element;
   an auto deal custom data type element;
   an auto policy custom data type element;
   an auto sales history custom data type element;
   an auto service history custom data type element;
   an auto service job custom data type element;
   an auto service repair order custom data type element;
   a balance statement custom data type element;
   a billing profile custom data type element;
   a bill of material component custom data type element;
   a bill of material custom data type element;
   a business unit custom data type element.

4. The method of claim 1, wherein the custom data type elements include one or more elements comprising:
   a claim custom data type element;
   a claim payment custom data type element;
   a class attribute custom data type element;
   a class attribute value custom data type element;
   a class custom data custom data type element;
   a contact-of custom data type element;
   a contract custom data type element;
   a cost list custom data type element; and
   a cost list line custom data type element.

5. The method of claim 1, wherein the custom data type elements include one or more elements comprising:
- a credit bureau report custom data type element;
- a customer-of custom data type element;
- an employee-of custom data type element;
- an expense custom data type element;
- an expense line custom data type element;
- a financial account custom data type element;
- a financial applicant custom data type element;
- a financial application account custom data type element;
- a financial application collateral custom data type element;
- a financial application custom data type element;
- a financial application funding source custom data type element; and
- a financial statement custom data type element.

6. The method of claim 1, wherein the custom data type elements include one or more elements comprising:
- a forecast custom data type element;
- a forecast line detail custom data type element;
- a product catalog custom data type element;
- a product catalog line item custom data type element;
- a product custom data type element;
- a product inventory location custom data type element;
- a product line custom data type element;
- a product price custom data type element;
- an installed product custom data type element;
- a price list custom data type element; and
- a price list line custom data type element.

7. The method of claim 1, wherein the custom data type elements include one or more elements comprising:
- a purchase order custom data type element;
- a purchase order line item custom data type element;
- a vehicle anti theft device custom data type element;
- a vehicle custom data type element;
- a vehicle option custom data type element;
- a person custom data type element;
- a policy custom data type element;
- a position custom data type element;
- a related-to custom data type element;
- a represented-by custom data type element;
- a security custom data type element;
- a service request custom data type element; and
- a set of books custom data type element.

8. The method of claim 1, wherein the custom data type elements include one or more elements comprising:
- an order custom data type element;
- an order line custom data type element;
- an order type custom data type element;
- an organization custom data type element;
- a party authentication custom data type element;
- a party custom data type element;
- a payment custom data type element;
- a payment line custom data type element;
- a payment method custom data type element;
- a payment term custom data type element; and
- a payment type custom data type element.

9. The method of claim 1, wherein the custom data type elements include one or more elements comprising:
- an opportunity custom data type element;
- an opportunity notes custom data type element;
- an opportunity revenue item custom data type element;
- an invoice custom data type element;
- an invoice line custom data type element;
- an invoice plan custom data type element;
- an invoice type custom data type element;
- a life policy custom data type element; and
- a list of relationship custom data type element.

10. The method of claim 1, wherein the custom data type elements include one or more elements comprising:
- an inventory balance custom data type element;
- an inventory balance list of balance balance custom data type element;
- an inventory transaction custom data type element;
- an inventory location custom data type element;
- a functional area custom data type element;
- a holding custom data type element; and
- a household custom data type element.

11. A computer-readable medium carrying one or more sequences of instructions for managing enterprise data, wherein execution of the one or more sequences of instructions by one or more processors causes the one or more processors to perform:
- extracting first enterprise information in a first form that is associated with a first source computerized system;
- converting the first enterprise information in the first form into corresponding first enterprise information that is in a second intermediate form; and
- converting the first enterprise information in the second intermediate form into first enterprise information that is in a target form that corresponds to a target computerized system, wherein information that is in the second intermediate form includes a plurality of custom data type elements that are adapted for capturing customer information and that can be referenced by other data structures of the information that is in the second intermediate form, and wherein any modifications of the other data structures are independent of the custom data type elements;
- transmitting the first enterprise information that is in the target form to the target computerized system for processing therein;
- converting the first enterprise information in the second intermediate form into first enterprise information that is in a second target form that corresponds to a second target computerized system;
- extracting second enterprise information in a third form that is associated with a second source computerized system that is distinct from the first source computerized system, wherein the third form is distinct from the first form;
- converting the second enterprise information in the third form into second enterprise information that is in the second intermediate form; and
- converting the second enterprise information in the second intermediate form into second enterprise information that is in the target form.

12. The computer-readable medium of claim 11, wherein the custom data type elements include one or more elements comprising:
- an address custom data type element;
- an auto deal custom data type element;
- an auto policy custom data type element;
- an auto sales history custom data type element;
- an auto service history custom data type element;
- an auto service job custom data type element;
- an auto service repair order custom data type element;
- a balance statement custom data type element;
- a billing profile custom data type element;
- a bill of material component custom data type element;
- a bill of material custom data type element; and
- a business unit custom data type element.

13. The computer-readable medium of claim 11, wherein the custom data type elements include one or more elements comprising:
 a claim custom data type element;
 a claim payment custom data type element;
 a class attribute custom data type element;
 a class attribute value custom data type element;
 a class custom data custom data type element;
 a contact-of custom data type element;
 a contract custom data type element;
 a cost list custom data type element; and
 a cost list line custom data type element.

14. The computer-readable medium of claim 11, wherein the custom data type elements include one or more elements comprising:
 a credit bureau report custom data type element;
 a customer-of custom data type element;
 an employee-of custom data type element;
 an expense custom data type element;
 an expense line custom data type element;
 a financial account custom data type element;
 a financial applicant custom data type element;
 a financial application account custom data type element;
 a financial application collateral custom data type element;
 a financial application custom data type element;
 a financial application funding source custom data type element; and
 a financial statement custom data type element.

15. The computer-readable medium of claim 11, wherein the custom data type elements include one or more elements comprising:
 a forecast custom data type element;
 a forecast line detail custom data type element;
 a product catalog custom data type element;
 a product catalog line item custom data type element;
 a product custom data type element;
 a product inventory location custom data type element;
 a product line custom data type element;
 a product price custom data type element;
 an installed product custom data type element;
 a price list custom data type element; and
 a price list line custom data type element.

16. The computer-readable medium of claim 11, wherein the custom data type elements include one or more elements comprising:
 a purchase order custom data type element;
 a purchase order line item custom data type element;
 a vehicle anti theft device custom data type element;
 a vehicle custom data type element;
 a vehicle option custom data type element;
 a person custom data type element;
 a policy custom data type element;
 a position custom data type element;
 a related-to custom data type element;
 a represented-by custom data type element;
 a security custom data type element;
 a service request custom data type element; and
 a set of books custom data type element.

17. The computer-readable medium of claim 11, wherein the custom data type elements include one or more elements comprising:
 an order custom data type element;
 an order line custom data type element;
 an order type custom data type element;
 an organization custom data type element;
 a party authentication custom data type element;
 a party custom data type element;
 a payment custom data type element;
 a payment line custom data type element;
 a payment method custom data type element;
 a payment term custom data type element; and
 a payment type custom data type element.

18. The computer-readable medium of claim 11, wherein the custom data type elements include one or more elements comprising:
 an opportunity custom data type element;
 an opportunity notes custom data type element;
 an opportunity revenue item custom data type element;
 an invoice custom data type element;
 an invoice line custom data type element;
 an invoice plan custom data type element;
 an invoice type custom data type element;
 a life policy custom data type element; and
 a list of relationship custom data type element.

19. The computer-readable medium of claim 11, wherein the custom data type elements include one or more elements comprising:
 an inventory balance custom data type element;
 an inventory balance list of balance balance custom data type element;
 an inventory transaction custom data type element;
 an inventory location custom data type element;
 a functional area custom data type element;
 a holding custom data type element; and
 a household custom data type element.

20. A method in a computing system for managing enterprise data, the method comprising:
 extracting enterprise information in a first form that is associated with a first source computerized system;
 converting the enterprise information in the first form into enterprise information that is in a second intermediate form; and
 converting the enterprise information in the second intermediate form into enterprise information in a target form that corresponds to a target computerized system, wherein the enterprise information in the second intermediate form includes a plurality of custom data type elements that contain custom customer information, wherein the plurality of custom data type elements can be referenced by other data structures in enterprise information in the second intermediate form, and wherein any modifications of the other data structures in the enterprise information in the second intermediate form are independent of the custom data type elements;
 modifying data in one of the other data structures in the enterprise information in the second intermediate form, wherein modification of data in the one of the other data structures in the enterprise information in the second intermediate form occurs without modification of data in any of the custom type elements;
 transmitting the enterprise information that is in the target form to the target computerized system for processing therein;
 converting a copy of the enterprise information in the second intermediate form into enterprise information that is in a second target form that corresponds to a second target computerized system;
 extracting second enterprise information in a third form that is associated with a second source computerized system that is distinct from the first source computerized system, wherein the third form is distinct from the first form;

converting the second enterprise information in the third form into second enterprise information that is in the second intermediate form; and converting the second enterprise information in the second intermediate form into second enterprise information that is in the target form.

21. A method in a computing system for managing enterprise data, the method comprising:

extracting first enterprise information in a first form that is associated with a first source computerized system;

converting the first enterprise information in the first form into corresponding first enterprise information that is in a second intermediate form; and converting the first enterprise information in the second intermediate form into first enterprise information that is in a first target form that corresponds to a first target computerized system, wherein information that is in the second intermediate form comprises a plurality of custom data type elements that are adapted for capturing customer information and that can be referenced by other data structures of the information that is in the second intermediate form;

converting the first enterprise information in the second intermediate form into first enterprise information that is in a second target form that corresponds to a second target computerized system;

transmitting the first enterprise information that is in the first target form to the first target computerized system for processing therein;

extracting second enterprise information in a third form that is associated with a second source computerized system that is distinct from the first source computerized system, wherein the third form is distinct from the first form;

converting the second enterprise information in the third form into second enterprise information that is in the second intermediate form; and converting the second enterprise information in the second intermediate form into second enterprise information that is in the first or second target form.

* * * * *

UNITED STATES PATENT AND TRADEMARK OFFICE
CERTIFICATE OF CORRECTION

| | | |
|---|---|---|
| PATENT NO. | : 7,287,041 B2 | Page 1 of 1 |
| APPLICATION NO. | : 10/809191 | |
| DATED | : October 23, 2007 | |
| INVENTOR(S) | : Barnes-Leon et al. | |

It is certified that error appears in the above-identified patent and that said Letters Patent is hereby corrected as shown below:

In column 1, line 7, after "application" delete "comer".

In column 5, line 50, delete "172" and insert -- 172. --, therefor.

In column 5, line 50, delete "product" and insert -- Product --, therefor.

In column 8, line 55, in Claim 3, after "element;" insert -- and --.

Signed and Sealed this

Twenty-fourth Day of June, 2008

JON W. DUDAS
*Director of the United States Patent and Trademark Office*